Patented Mar. 15, 1949

2,464,497

UNITED STATES PATENT OFFICE 2,464,497

MINERAL OIL COMPOSITION

John J. Giammaria, Woodbury, N. J., assignor to Socony-Vacuum Oil Company, Incorporated, a corporation of New York No Drawing. Application March 12, 1946, Serial No. 653,936

6 Claims. (Cl. 252—34)

This invention has to do with the improvement of mineral oil fractions. More particularly, this invention has to do with the stabilization of such fractions by the incorporation therein of a small amount of a novel compound, or novel class of compounds, capable of inhibiting a viscous mineral oil against the deleterious effects of oxidation and of improving the detergent properties of a viscous mineral oil.

It is well known to those familiar with the art that the deleterious effects of oxidation upon a mineral oil fraction manifests itself in various, ways depending upon the source of the oil, i. e., the crude oil from which it has been derived, the refining treatment to which the oil has been subjected and the particular conditions under which the oil is subjected to oxidation. For example, mineral oil fractions refined for use, as lubricants have a tendency to oxidize under conditions of use with the formation of sludge or acidic oxidation products. Also, in the case of internal combustion engines, particularly those, operating with high cylinder pressures, there is a decided tendency for the ordinary lubricating oil fractions to form carbonaceous deposits which cause the piston rings to become stuck in their slots and which fill the slots in the oil ring or rings, thus materially reducing the efficiency of the engine.

The oil-improving agents contemplated herein effectively inhibit a viscous mineral oil against the deleterious effects of oxidation under conditions such as the foregoing. Moreover, these improving agents are characterized by a high degree of detergent action in oils.

The oil-improving agents of this invention are oil-soluble coordinated metal complexed of a metal, an organic base and an organic acid, and are characterized by the nucleus:

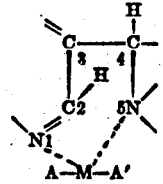

wherein the group

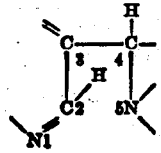

represents an organic base characterized by two tertiary nitrogen atoms in the positional relationship shown. In this nucleus, M is a metal selected from the group consisting of copper, mercury, aluminum, lead, cobalt and nickel, and A and A' are acid groups.

The organic bases which are contemplated herein as components and the coordinated metal complexes of this invention are all characterized by two tertiary nitrogen atoms in 1,5 relationship as typified by nicotine.

The organic acids which are used herein in forming the aforesaid coordinated metal complexes include aliphatic acids, particularly those containing six or more carbon atoms, aromatic acids, substituted aromatic acids, such as salicylic acid and hexylbenzoic acid, abietic acid, naphthenic acids, sulfonic acids, such as alkylated aryl sulfonic acids, dithiophosphoric acids, such as dialkyl and dialkaryl dithiophosphoric acids. As indicated hereinabove, the characteristic nucleus of the metal complexes contains two acid groups (A and A') associated with a metal atom. The groups A and A' are acid groups wherein one acid hydrogen is replaced by a metal atom (M). By way of illustration, acid groups (A and A') are typified by

and

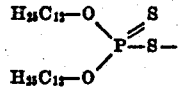

Of the foregoing metals it has been found that copper is outstanding in forming metal complexes characterized by a high order of stability. Other metals such as cobalt and nickel form complexes of the aforesaid type but such complexes are somewhat less stable.

The metal complexes of this invention are typified by cupric nicotinammino laurate which is prepared by the following typical procedure. To an aqueous solution of cupric sulfate pentahydrate containing one mol of cupric sulfate were added two mols of cocoanut oil acid, which is predominantly lauric acid or dodecyl carboxylic acid. The reaction mixture thus obtained was heated to about 70° C. and, while stirring, one mol of nicotine was added thereto. A 10-20 per cent caustic solution, in an amount exactly equivalent to the cupric sulfate pentahydrate, was then added to the reaction mixture in a thin stream.

After stirring for a short while, for about 15 minutes, the resulting reaction mixture was allowed to stand. The copper complex thus formed separated as a green viscous upper layer which was decanted. The complex was filtered and dried such as by distillation using benzene as a carrier for entrained water. The coordinated complex thus obtained was cupric nicotinammino laurate which contains 10 per cent copper and 25 per cent nicotine.

In preparing the coordinated complexes such as the cupric complex shown above, inert solvents such as benzene and mineral oil may be used and are preferably used when extremely viscous metal complexes are desired. Low boiling solvents such as benzene may be separated from the complex formed therein by distillation to obtain the complex per se. When mineral oil or similar high boiling diluents are used, they may be retained, thus providing mineral oil concentrates and the like of the coordinated complexes.

The effectiveness of this class of compounds upon the known tendency of an oil to cause ring-sticking and sludge deposition during operation was determined in an internal combustion engine. The test was carried out in a single cylinder C. F. R. engine which was operated continuously at a speed of 1200 R. P. M. over a time interval of 28 hours. The temperature of the cooling medium for the engine was held at approximately 390° F. and the oil temperature was held at 175° F. during the test. The oil used was a lubricating oil stock having a kinematic viscosity of 25.0 centistokes at 210° F. and the conditions observed at the end of the test were:

(a) The extent to which the piston rings were stuck.

(b) The extent to which the slots in the oil rings were filled with carbonaceous deposit, (c) The amount of carbonaceous deposits in the oil, (d) The acidity or neutralization number (N. N.) of the oil, (e) Viscosity of the oil at 210° F.

The improved results obtained by the addition of this type of compound to the oil is illustrated in Table I.

Table I

| Oil[1] | Ring Condition ||||||||  Deposits | N. N. | Kin. Vis. at 210° F. |
| | Degrees Stuck ||||| Per Cent Slots Filled ||| | | |
| | 1 | 2 | 3 | 4 | 5 | 3 | 4 | 5 | | | |
|---|---|---|---|---|---|---|---|---|---|---|---|
| A | 360 | 360 | 360 | 360 | 90 | 60 | 50 | 30 | 19.6 | 1.7 | 29.13 |
| B | 0 | 0 | 0 | 0 | 0 | 10 | 5 | 5 | 5.5 | 0.8 | 25.97 |

[1] Oil A = Blank.
Oil B = Oil A+0.5% cupric nicotinammino laurate.

To demonstrate the antioxidant effect of this type of compound the above complex, cupric nicotinammino laurate, was evaluated in the Lauson oxidation stability test. This test was carried out in a Lauson single cylinder, 4 cycle, liquid cooled gasoline engine with jet lubrication at a speed of 1815 R. P. M. operated continuously for 36 hours. The temperature of the oil was held at 280° F. during the test. The oil used was a lubricating oil stock having a kinematic viscosity of 5.71 centistokes at 210° F. The conditions observed at the end of the test were neutralization number (N. N.) and viscosity at 210° F.

The results obtained in this test are given in Table II.

Table II

| Oil[1] | Kin. Vis. at 210° F. | N. N. |
|---|---|---|
| A | 9.83 | 9.8 |
| B | 6.25 | 1.2 |

[1] Oil A = Blank.
Oil B = Oil A+0.5% cupric nicotinammino laurate.

The foregoing data clearly demonstrate the improved detergent and antioxidant properties which are imparted to a lubricating oil by the addition of a small percentage of this type of compound. The amount of improving agent used may be varied depending upon the oil fraction and the properties desired in the final composition. Amounts varying from 0.1 per cent to 5.0 per cent may be used but, in general, desirable improvement is obtained with concentrations of 0.1 per cent to 1.0 per cent.

It is to be understood that while preferred procedures for synthesizing improving agents of the type contemplated herein and preferred reactants for such improving agents have been described hereinabove, the invention is not to be construed as limited to these specific embodiments, but is to be broadly construed in the light of the language of the appended claims.

I claim:

1. A viscous mineral lubricating oil fraction containing a minor proportion, from about 0.1 per cent to about 5.0 per cent, of an oil-soluble, coordinated metal complex characterized by the nucleus

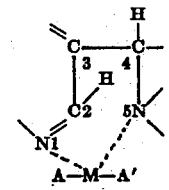

wherein the group

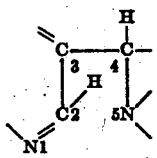

represents an organic base characterized by two tertiary nitrogen atoms in the positional relationship shown; M is a metal selected from the group consisting of copper, mercury, aluminum, lead, cobalt and nickel; and A and A' are organic acid groups; said metal complex acting to stabilize the oil fraction against oxidation.

2. A viscous mineral lubricating oil fraction containing therewith a minor proportion, from about 0.1 per cent to about 5.0 per cent, of an oil-soluble, coordinated metal complex represented by the general formula:

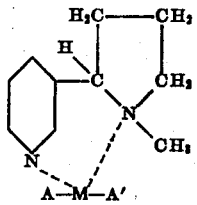

wherein M is a metal selected from the group consisting of copper, mercury, aluminum, lead, cobalt and nickel; and A and A' are organic acid groups; said metal complex acting to stabilize the oil fraction against oxidation.

3. A viscous mineral lubricating oil fraction containing a minor proportion, from about 0.1 per cent to about 5.0 per cent, of an oil-soluble, coordinated copper complex represented by the general formula:

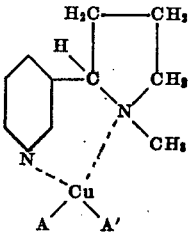

wherein A and A' are organic acid groups; said copper complex acting to stabilize the oil fraction against oxidation.

4. A viscous mineral lubricating oil fraction containing a minor proportion, from about 0.1 per cent to about 5.0 per cent, of an oil-soluble, coordinated metal complex represented by the general formula:

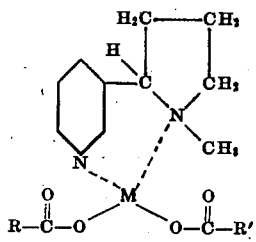

wherein M is a metal selected from the group consisting of copper, mercury, aluminum, lead, cobalt, and nickel; and R and R' are alkyl groups containing at least 6 carbon atoms; said metal complex acting to stabilize the oil fraction against oxidation.

5. A viscous mineral lubricating oil fraction containing a minor proportion, from about 0.1 per cent to about 5.0 per cent, of an oil-soluble, coordinated copper complex represented by the general formula:

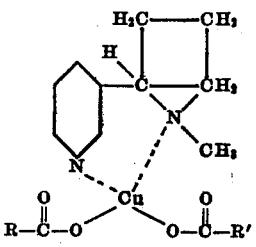

wherein R and R' are alkyl groups containing at least 6 carbon atoms; said copper complex acting to stabilize the oil fraction against oxidation.

6. A viscous mineral lubricating oil fraction containing a minor proportion, from about 0.1 per cent to about 5.0 per cent of an oil-soluble, coordinated metal complex comprising cupric nicotinammino laurate represented by the formula:

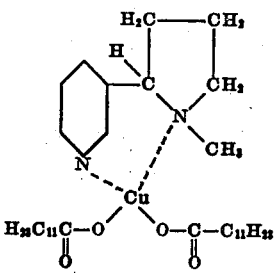

said metal complex acting to stabilize the oil fraction against oxidation.

JOHN J. GIAMMARIA.

REFERENCES CITED

The following references are of record in the file of this patent:

UNITED STATES PATENTS

| Number | Name | Date |
|---|---|---|
| 2,294,525 | Waugh | Sept. 1, 1942 |
| 2,356,185 | Smith | Aug. 22, 1944 |
| 2,360,042 | Dearborn | Oct. 10, 1944 |
| 2,392,961 | Woodward | Jan. 15, 1946 |
| 2,414,213 | Smith | Jan. 14, 1947 |

OTHER REFERENCES

United States Dept. of Agriculture, Agricultural Research Administration, Bureau of Entomology and Plant Quarantine: Nicotine Insecticides, part 1, New Metal-nicotine compounds by Mayer and Gahan, 1945, pages 2 and 3.